United States Patent Office 3,452,078
Patented June 24, 1969

3,452,078
DERIVATIVES OF GLYCYRRHETINIC ACID
John Cameron Turner, West Wickham, Kent, and William Alan McFarlane Davies, Goodmayes, Ilford, Essex, England, assignors to Biorex Laboratories Limited, London, England
No Drawing. Filed Nov. 21, 1966, Ser. No. 595,610
Claims priority, application Great Britain, Nov. 26, 1965, 50,243/65
Int. Cl. C07c *69/74, 49/36;* C07d *5/06*
U.S. Cl. 260—468.5
3 Claims The present invention is concerned with new pharmaceutically-active derivatives of glycyrrhetinic acid and with the preparation thereof.

The new derivatives of glycyrrhetinic acid according to the present invention are compounds of the general formula:

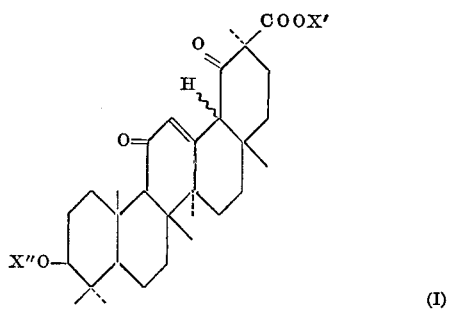

(I)

wherein X' is an alkyl radical and X" is an acyl radical or wherein X" is a hydrogen atom and X' is a hydrogen or alkali metal atom.

The alkyl radical X', which preferably contains up to 6 carbon atoms, can be straight-chained or branched-chained. Examples of such alkyl radicals include methyl, ethyl, n-propyl, isopropyl, n-butyl, isobutyl and n-hexyl radicals.

The acyl radical X" is preferably derived from a mono- or dicarboxylic acid containing up to 6 carbon atoms. Examples of such acids include acetic acid, propionic acid, butyric acid, caproic acid, malonic acid and succinic acid. In the case of dicarboxylic acids, the second carboxylic acid group can be free or esterified.

The new compounds according to the present invention can be prepared by oxidising the corresponding esters of the general formula:

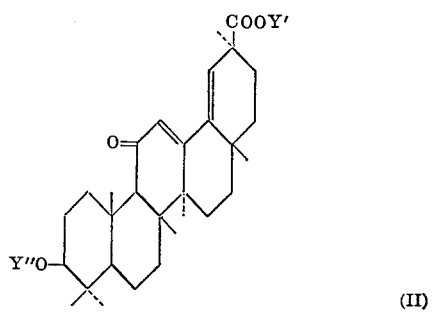

(II)

wherein Y' is an alkyl radical and Y" is an acyl radical, the products thereby obtained then, if desired, being hydrolysed.

The oxidation of the esters (II) is preferably carried out with the use of chromium trioxide-aqueous acetic acid. The reaction is preferably carried out at an elevated temperature, for example, by heating the reaction mixture on a steam bath.

The oxidation reaction gives not only the desired diketones but also minor amounts of lactonic esters of the general formula:

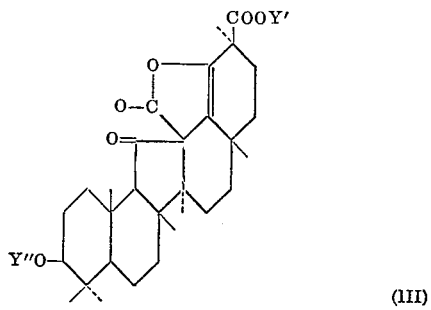

(III)

wherein Y' and Y" have the same meanings as above. These lactonic esters have already been described (J.C.S., 1956, 1949).

The desired diketones (II) can be isolated from the products obtained by fractional crystallisation, for example, from methanol.

The hydrolysis of the 3-O-acyl diketo acid esters to the corresponding 3-hydroxy-diketo-3-oic acid (X' and X" in general Formula I are both hydrogen atoms) is preferably carried out by heating under reflux with an aqueous ethanolic solution of an alkali metal hydroxide, such as potassium hydroxide. The free acid can be isolated from the reaction mixture by acidification.

The new compounds according to the present invention possess valuable anti-inflammatory properties and, at the same time, have a very low toxicity.

The following examples are given for the purpose of illustrating the present invention.

EXAMPLE 1

Methyl 3β-acetoxy-11,19-dioxo-18α-olean-12-en-30-oate

During the course of 15 minutes, a solution of 3.81 g. chromium trioxide in 4 cc. water and 100 cc. glacial acetic acid (A.R.) were gradually added to a solution of 10 g. methyl 3-O-acetyl-18-dehydro-glycyrrhetinate in 100 cc. glacial acetic acid (A.R.) which had been heated to 90° C. The reaction mixture was then heated on a steam bath (internal temperature 96°C.) for a further 45 minutes. 400 cc. water were then gradually added, with stirring, to the hot reaction mixture which was then cooled to room temperature. The solid which separated was filtered off, thoroughly washed with water and dried at 100° C. The crude product was then fractionally crystallised from methanol. The less soluble lactonic ester (III; Y'—CH$_3$ and Y"=CH$_3$CH) was first removed. It was obtained in a yield of about 1 g. and had a melting point of 296.5–297.5° C.; $[\alpha]_D^{20} = +3°$ (c.=1% in chloroform). There were then obtained about 3 g. of the desired methyl 3β-acetoxy-11,19-dioxo-18α-olean-12-en-30-oate (I; X'=CH$_3$ and X"=CH$_3$CO) in the form of colourless crystals with a melting point of 253.5–254° C.; $[\alpha]_D^{20} = +180 \pm 1°$ (c.=1% in chloroform);

$$\lambda_{max.}^{CH_3OH} = 247 \text{ m}\mu (\log \epsilon\ 4.03)$$

*Analysis.*—C$_{33}$H$_{48}$O$_6$ (M.W. 540.7). Calcd.: C, 73.3%; H, 8.95%. Found: C, 73.2%; H, 9.05%.

EXAMPLE 2

3β-hydroxy-11,19-dioxo-18α-olean-12-en-30-oic acid

A solution of 5 g. methyl 3β-acetoxy-11,19-dioxo-18α-olean-12-en-30-oate in 50 cc. of a 10% solution of potassium hydroxide in ethanol-water (9:1) was heated under reflux on a steam bath for 15 minutes. The hot reaction mixture was then acidified by the gradual addition of dilute hydrochloric acid, cooled and the crystalline product filtered off, washed with water, dried and recrystallised from methanol. There were obtained 4 g. 3β-hydroxy-11,19-dioxo-18α-olean-12-en-30-oic acid with a melting point of about 230° C. (decomp.); $[\alpha]_D^{20} = +200 \pm 1°$ (c.=1% in chloroform).

The present invention also includes within its scope pharamaceutical compositions containing one or more of the new compounds of general Formula I. These pharmaceutical compositions can be administered orally or parenterally in admixture with a solid or liquid pharmaceutical carrier.

Solid compositions for oral administration include compressed tablets, pills, dispersible powders and granules. In such solid compositions, at least one active compound of general Formula I is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of absorbable material, such as gelatine, containing at least one of the active substances of general Formula I, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the desired therapeutic effect shall be obtained. In general, the preparations of the present invention should be administered, in the case of oral administration, to give 20 to 800 mg. of active substance per day and, in the case of parenteral administration, 10 to 500 mg. of substance per day.

The following examples illustrate pharmaceutical compositions according to the present invention:

EXAMPLE 3

200 mg. tablets are prepared containing:

| | |
|---|---|
| 3β - hydroxy - 11, 19 - dioxo-18α-olean-12-en-30-oic acid | mg____ 50 |
| Starch | mg____ 145 |
| Magnesium stearate | mg____ 5 |

EXAMPLE 4

150 mg. tablets are prepared containing:

| | |
|---|---|
| Methyl 3β - acetoxy - 11,19 - dioxo-18α-olean-12-en-30-oate | mg____ 35 |
| Starch | mg____ 90 |
| Lactose | mg____ 20 |
| Magnesium stearate | mg____ 5 |

We claim:
1. Glycyrrhetinic acid derivatives of the formula:

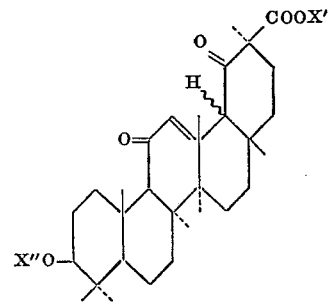

wherein X' is an alkyl radical and X" is an acyl radical derived from an alkane-dioic or alkanoic acid having up to 6 carbon atoms or wherein X" is a hydrogen atom and X' is a hydrogen or alkali metal atom.

2. A derivative according to claim 1 which is methyl 3β-acetoxy-11,19-dioxo-18α-olean-12-en-30-oate.

3. A derivative according to claim 1 which is 3β-hydroxy-11,19-dioxo-18α-olean-12-en-30-oic acid.

References Cited

UNITED STATES PATENTS

| 3,084,185 | 4/1963 | Gottfried | 260—488 |
| 3,311,613 | 3/1967 | Davies | 260—239.3 |

LORRAINE A. WEINBERGER, *Primary Examiner.*

PAUL J. KILLOS, *Assistant Examiner.*

U.S. Cl. X.R.

260—514.5; 424—305, 317